J. H. GRIDLEY.
LOCKING WASHER FOR NUTS.

No. 62,483. Patented Feb. 26, 1867.

Witnesses:
Geo. W. Rothwell
Solon C. Kemon

Inventor:
James H. Gridley

United States Patent Office.

JAMES H. GRIDLEY, OF WASHINGTON, DISTRICT OF COLUMBIA.

Letters Patent No. 62,483, dated February 26, 1867.

LOCKING WASHER FOR NUTS.

The Schedule referred to in these Letters Patent and making part of the same.

TO ALL WHOM IT MAY CONCERN:

Be it known that I, JAMES H. GRIDLEY, of Washington, in the county of Washington, and District of Columbia, have invented a new and improved Locking Washer for Nuts; and I do hereby declare the following to be a full, clear, and exact description of the nature, construction, and operation of the same, sufficient to enable those skilled in the art to which my invention appertains to fully understand and use the same, reference being had to the accompanying drawings, forming part of this specification, and in which—

Figure 1:
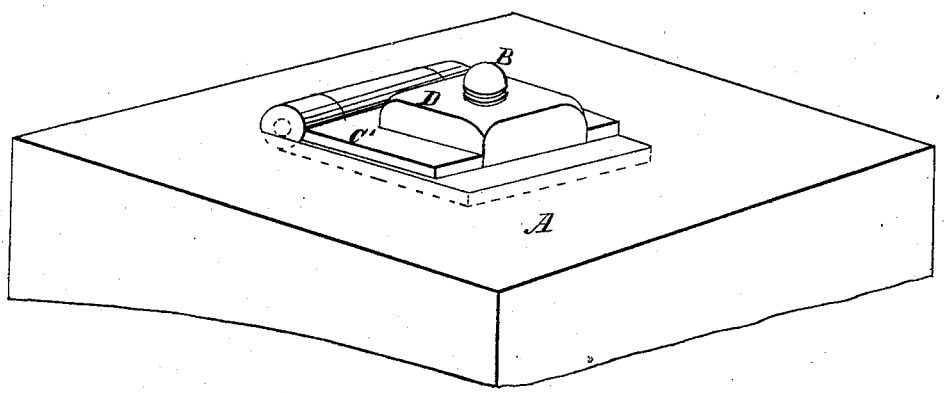
Figure 4:
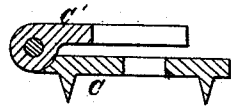
Figure 2:
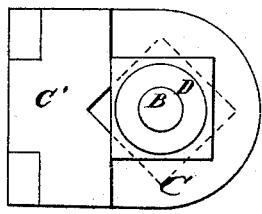
Figure 3:
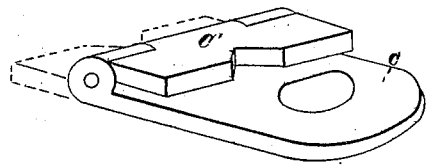

Figure 1 is a perspective view.
Figure 2 is a plan.
Figure 3 is a perspective view of a detached locking washer.
Figure 4 is a section.

This invention consists of a hinged or pivoted plate, which folds down upon one or more edges of the nut, to prevent the latter from turning. When the plate is hinged or pivoted to the washer, the latter is prevented from turning by sinking it into the face of the object, in whole or in part, by fitting it against a protuberance of the object to which it is attached or by fitting it to the bolt so as not to rotate thereon.

In the drawings, A, fig. 1, may be taken as the face of a bridge beam through which the bolt B is passed; D is a nut screwed on to the bolt, and C is a washer underneath the nut. To the washer proper is hinged a flap or leaf, C', which, when raised, permits the nut to be rotated either for removal or tightening, and when folded down comes in contact with a side or sides of the nut, so as to prevent the latter from turning. In this case, the washer C is shown sunk in part into the wood, to prevent its turning. Fig. 2 shows the folding portion C so arranged as to lock the washer at quarter or one-eighth turns, the side of the nut being in contact with the edge of the leaf or the angle of the nut D projecting into the notch in the edge of the leaf C. Fig. 3 is a perspective view of a detached locking washer, in which the bolt hole b has a flat side to correspond to one side of a bolt from which the threads have been removed. It does not materially weaken a bolt to remove a portion of its threads so long as the barrel of the bolt is left intact, and the washer, fig. 3, being placed upon a bolt with one side thus flattened will not rotate thereon. The nut then being screwed on and the leaf C' folded down against it, as seen in figs. 1 and 2, the nut and washer are rendered secure from becoming loose. Fig. 4 is a section showing talons on the back of a washer, adapted to pierce into wood and secure it from turning. A circular flange may project from the back of the washer and be countersunk in the wood; a square hole through this may be occupied by a square portion of the bolt, and the washer thus be prevented turning on the bolt; or a square hole through the washer may fit a bolt of corresponding form. Thus it is apparent that either the object to which it is attached or the bolt itself may present the obstacle to the turning of the washer. My device is a hinged or pivoted plate, which folds or falls down against the edge or edges of the nut, to prevent its rotation.

Having described my invention, what I claim therein as new, and desire to secure by Letters Patent, is—

A hinged or pivoted plate, which folds or falls against one or more edges of a nut, to prevent its rotation.

JAMES H. GRIDLEY.

Witnesses:
JOHN A. WIEDERSHEIM,
SOLON C. KEMON.